United States Patent
Armstrong et al.

(10) Patent No.: US 6,848,415 B2
(45) Date of Patent: Feb. 1, 2005

(54) INTERNAL COMBUSTION ENGINE WITH DIRECT INJECTION

(75) Inventors: Neil Armstrong, Remseck (GB); Peter Hohner, Stuttgart (DE); Anton Waltner, Korb (DE)

(73) Assignee: DaimlerChrysler AG, Stuttgart (DE)

( * ) Notice: Subject to any disclaimer, the term of this patent is extended or adjusted under 35 U.S.C. 154(b) by 138 days.

(21) Appl. No.: 10/393,485

(22) Filed: Mar. 20, 2003

(65) Prior Publication Data

US 2003/0209223 A1 Nov. 13, 2003

(30) Foreign Application Priority Data

Mar. 22, 2002 (DE) .......................................... 102 12 998

(51) Int. Cl.[7] .................................................. F02B 5/00
(52) U.S. Cl. ................................ 123/305; 123/169 EA; 123/169 R
(58) Field of Search .................................. 123/305, 294, 123/406.11, 169 R, 169 EA

(56) References Cited

U.S. PATENT DOCUMENTS 5,327,864 A      7/1994  Regueiro

FOREIGN PATENT DOCUMENTS

| DE | 197 30 908 | 1/1999 |
|----|------------|--------|
| DE | 199 19 642 | 11/2000 |
| JP | 10-30442   | 2/1998 |
| JP | 11-82029   | 3/1999 |

*Primary Examiner*—Bibhu Mohanty
(74) *Attorney, Agent, or Firm*—Kenyon & Kenyon

(57) ABSTRACT

A four-stroke reciprocating-piston internal combustion engine includes a fuel injection device, which is arranged centrally in a combustion space and which introduces the fuel in the form of an injection cone into the combustion space, and includes at least one spark plug for each combustion space, the electrodes of which spark plug are arranged at the edge of the injection cone. At least two spark plugs are provided, of which the second spark plug has a markedly higher spark gap than the first spark plug.

8 Claims, 2 Drawing Sheets

INTERNAL COMBUSTION ENGINE WITH DIRECT INJECTION

CROSS-REFERENCE TO RELATED APPLICATIONS

The present application claims priority to Application No. 102 12 998.3, filed in the Federal Republic of Germany on Mar. 22, 2002, which is expressly incorporated herein in its entirety by reference thereto.

FIELD OF THE INVENTION

The present invention relates to a four-stroke reciprocating-piston internal combustion engine and to a method for operating the four-stroke reciprocating-piston internal combustion engine.

BACKGROUND INFORMATION

The aims of developments in internal combustion engines are to lower the fuel consumption and to reduce exhaust-gas and noise emissions. In order to achieve both high torque values and power values and low part-load consumption in spark-ignition petrol engines, in the case of four-stroke reciprocating-piston internal combustion engines with direct fuel injection into the combustion space a mixed operating mode within the engine characteristic diagram is implemented in that, in the upper rotational-speed range and load range, a homogeneous operating mode with a stoichiometric air ratio in combustion is carried out and, in the middle and lower rotational-speed range and load range, a stratified-charge operating mode with a largely unthrottled air supply and with a stratified charge is carried out.

In order to achieve a homogeneous fuel/air mixture, fuel is injected directly into the combustion space of the reciprocating-piston internal combustion engine at a very early stage, specifically even during the suction stroke of the reciprocating piston. As a result, the intake air quantity is efficiently utilized and a high average pressure and consequently a high torque value are achieved. Under part-load, quality control becomes possible by charge stratification, in that the fuel is injected only very late into the combustion space during the compression stroke of the reciprocating piston. In practice, reciprocating-piston internal combustion engines for motor vehicles are operated essentially in the part-load range. The characteristic-diagram range for the essential driving situations should therefore coincide throughout the characteristic-diagram range with a charge stratification which is beneficial in terms of consumption.

In combustion methods for reciprocating-piston internal combustion engines with a direct injection of petrol fuels, a distinction is made between three basic patterns, to be precise a jet-controlled method, a wall-controlled method and an air-controlled method. Depending on the method, the properties of the fuel jet, the combustion-space geometry and the charge movement are important influencing variables. A jet-controlled method is characterized by the close spatial relationship between the fuel injection device and the spark plugs. The fuel cloud injected into the combustion space via the fuel injection device forms a compact zone, into which swirled air is mixed to a limited extent. For controlling the stratification profile, the spatial arrangement of the fuel injection device and spark plug must be coordinated exactly, since an ignitable mixture must be present at a spark plug at the ignition point.

German Published Patent Application No. 197 30 908 describes a four-stroke reciprocating-piston internal combustion engine. It is operated in a stratified-charge operating mode in part of its operating characteristic diagram, preferably during idling and in the low rotational-speed and load range, and is operated in a homogeneous operating mode in a stratified-charge operating mode and in the remaining characteristic diagram. In the stratified-charge operating mode, the necessary fuel quantity is injected into the combustion space at the end of the compression stroke, with the result that a mixture cloud with strata having different fuel/air ratios. In this case, an ignitable mixture occurs at the edge of the injection cone, in cooperation with a combustion-space flow, and is ignited by an ignition spark between the electrodes of a spark plug. If the fuel/air mixture is too rich or too lean, that is to say does not correspond essentially to a stoichiometric mixture, it is not ignitable. So that the ignition spark reliably ignites the cylinder charge, the spark duration is prolonged in the stratified-charge operating mode, as compared with the homogeneous operating mode.

When the internal combustion engine is operated in the full-load mode with homogeneous mixture formation, the fuel is injected into the cylinder predominantly as early as the intake stroke, only ignitable mixture being present between the electrodes at the ignition point due to the good mixture preparation, and a minimal spark duration of about 0.1 milliseconds being sufficient for ignition. A control unit is provided, which, on the basis of at least one operating parameter of the internal combustion engine, generates a control signal with evidence of the spark duration and supplies it to the ignition system.

For a misfire-free stratified-charge operation of the internal combustion engine, it is necessary for the spark plug to project into the edge region of the injection cone, since ignitable mixture occurs in this region only. If, for example because of carbonization of the injection nozzle, there is an unintended change in the cone angle at which the injection cone of the fuel extends into the combustion space, combustion misfires occur, since the ignition spark is no longer located in the region of an ignitable mixture.

It is an object of the present invention to provide a four-stroke reciprocating-piston internal combustion engine with spark ignition, which is operated in a homogeneous mode and in a stratified-charge mode, in which the ignition reliability of the fuel/air mixture in the combustion space may be improved.

SUMMARY

The above and other beneficial objects of the present invention may be achieved by providing a four-stroke reciprocating-piston internal combustion engine and method as described herein.

According to an example embodiment of the present invention, at least two spark plugs are provided for each combustion space, of which the second spark plug has a markedly higher spark gap than the first spark plug. The higher spark gap of the spark plug and the resulting longer ignition spark may counteract a changed injection-jet characteristic which may arise due to the carbonization of the injection nozzle, in that it may allow better mixture accessibility and may cover a larger edge zone of the injection cone. However, due to Paschen's law, a higher spark gap of the spark plug may lead to a higher breakdown voltage of the spark. This may be required for generating the spark. It may be dependent on the product of the cylinder pressure at the ignition point and the spark gap of the spark plug. After spark breakdown, the voltage necessary for maintaining the spark may fall to a few hundred volts. This voltage is referred to as the arc voltage of the spark.

In view of an efficient thermal circulatory process, the fuel/air mixture may be ignited just before the top dead center at the end of the compression stroke. Since the breakdown voltage is relatively high at this time on account of the high cylinder pressure, in ignition systems used at the present time, with a maximum high voltage of typically 32 kV, this breakdown voltage may be ensured only for spark plugs with a spark gap of one millimeter. Only the spark plug with the small spark gap may have a very high degree of ignition reliability under these circumstances. It may therefore be assigned, e.g., to homogeneous operation, in which the spatial relationship between the injection cone of the fuel and the spark plug is of minor importance, but, because of the ignitable stoichiometric fuel/air mixture in the cylinder, the ignition point at which the fuel is ignited immediately may be just before the top dead center of the piston. Furthermore, homogeneous operation is adopted in the full-load operating mode of the internal combustion engine in which the internal combustion engine tends to knock. In order to reduce the tendency to knocking, the spark plug having the smaller spark gap may be arranged toward the outlet side of the combustion space, so that the spark plug with the higher spark gap is arranged further toward the inlet side of the combustion space.

The smaller spark gap may amount to approximately one millimeter and the higher spark gap to approximately three millimeters. Since, in the case of a high spark gap of, for example, three millimeters, with the ignition systems used at the present time the breakdown voltage may no longer be reached reliably at the end of the compression stroke, a method for operating a four-stroke reciprocating-piston internal combustion engine is provided, in which, in a stratified-charge mode, the spark plugs with the higher spark gap are ignited even at an ignition point before their breakdown voltage exceeds a maximum ignition voltage to be generated by the ignition system. The fuel is injected into the combustion space, with a start of injection just before top dead center, after the ignition point and during a spark duration, whereas, in a homogeneous mode, the fuel is injected into the combustion space or cylinder predominantly as early as during an intake stroke, before an ignition point of the spark plug having the smallest spark gap. In this case, the spark plugs with the higher spark gap operate solely during stratified-charge operation, so that they do not contribute to the ignition of the homogeneous fuel/air mixture during homogeneous operation. The spark plugs with the smaller spark gap may operate during homogeneous operation. However, they may also be ignited during stratified-charge operation in order to improve the combustion cycle.

In an example embodiment of the method according to the present invention, the spark plugs with the higher spark gap are ignited, in the stratified-charge mode, even at a relatively low compression pressure at which the ignition system is capable of generating the necessary breakdown voltage. The ignition system subsequently maintains the markedly lower arc voltage of the spark, until the fuel is injected just before the top dead center and reliably impinges with an ignitable mixture fraction onto the long ignition spark. A characteristic of an example embodiment of the method according to the present invention is that, in the homogeneous mode, the ignition point of the fuel/air mixture is determined by the ignition point of the spark plug having the smaller spark gap, whereas, in the stratified-charge mode, the ignition point is defined essentially by the injection point of the fuel. In order to improve the stability of the spark plug with the higher spark gap and to reduce the necessary energy outlay, it is provided, in an example embodiment of the method according to the present invention, to maintain the spark duration of the spark plugs with the higher spark gap initially with minimal energy after the ignition point and to increase the spark current and consequently the energy at the start of fuel injection. The ignition of the fuel/air mixture may thereby be intensified at a relatively low energy outlay.

An ignition system which may provide a controllable spark duration may be used. An alternating-voltage ignition system, by which the spark duration may be controlled, may be used.

Further aspects may be gathered from the following description when read in conjunction with the drawings. The drawings illustrate exemplary embodiments of the present invention.

DETAILED DESCRIPTION

Figure 1:
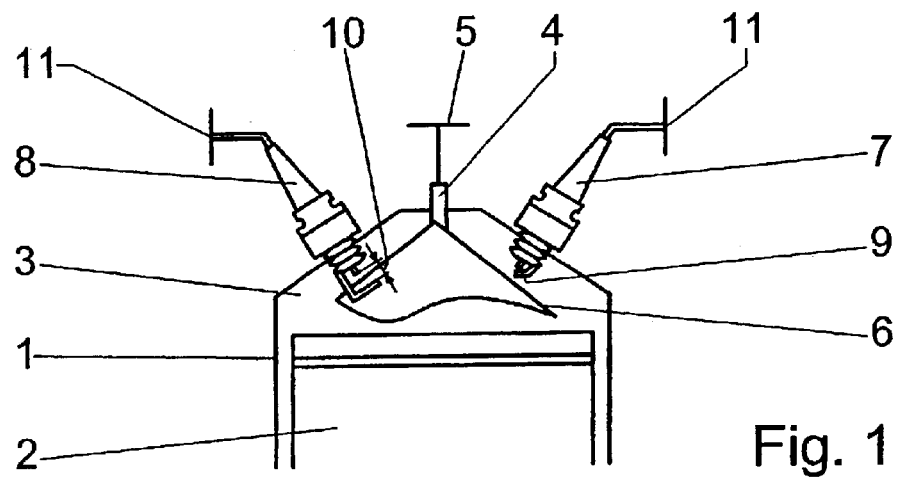
FIG. 1 is a schematic partial cross-sectional view through a cylinder unit of a four-stroke reciprocating-piston internal combustion engine.

FIG. 1 illustrates diagrammatically, in a partial longitudinal cross-sectional view, a cylinder unit of a four-stroke reciprocating-piston internal combustion engine. The cylinder unit includes a cylinder 1, in which a piston 2 moves up and down in a conventional manner by the four-stroke method. The piston 2 delimits a combustion space 3 which has a roof-shaped inner contour toward a cylinder head. A fuel injection device 4, to which fuel is supplied via a fuel line 5, projects from this contour into the combustion space 3. The fuel injection device 4 is arranged centrally in the combustion space 3 on the longitudinal axis of the cylinder 1 and of the piston 2 and injects the fuel in the form of an injection cone 6 which widens toward the piston 2. On both sides of the injection cone 6 are arranged spark plugs 7 and 8 which are connected via ignition lines 11 to an ignition system and are supplied with the necessary high voltage at the ignition point. The ignition system may be an alternating-voltage ignition system, by which the spark duration 24, 29 (FIG. 4) may be controlled. It is possible that any other ignition system delivering a controllable spark duration may be used.

Figure 4:
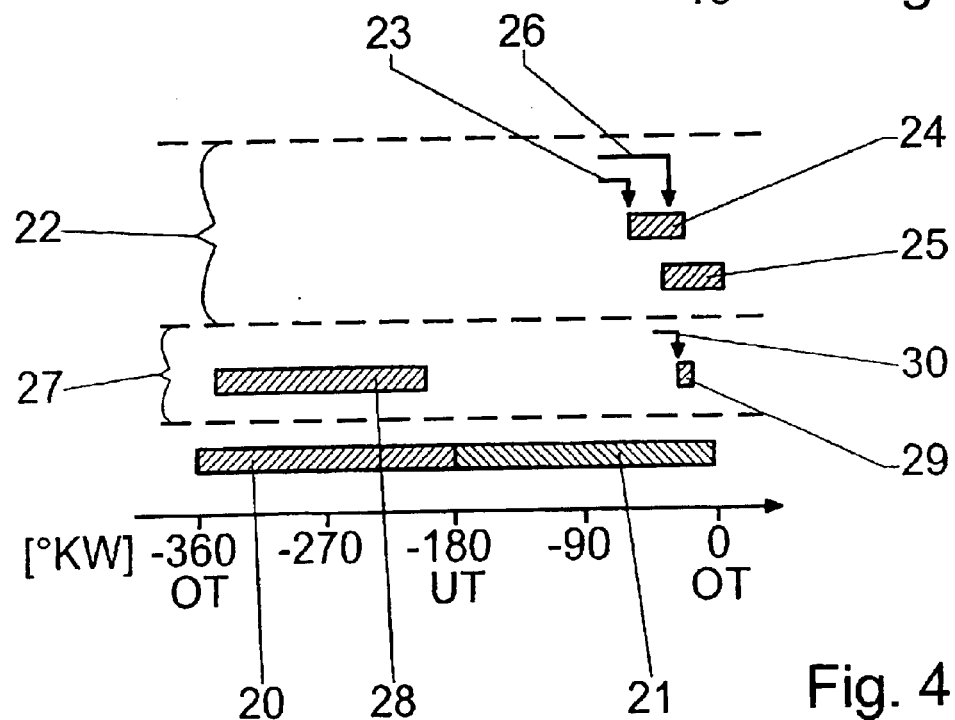
FIG. 4 illustrates a diagram of a time sequence of fuel injection and ignition in the stratified-charge mode and the homogeneous mode.

Of the spark plugs 7 and 8, the spark plug 7 includes a smaller spark gap 9, e.g., of the order of magnitude of one millimeter, and is arranged on the outlet side of the combustion space 3, in order to reduce the tendency to knocking of the internal combustion engine during a homogeneous operating mode 27 (FIG. 4). The second spark plug 8 includes a higher spark gap 10, e.g., of the order of magnitude of three millimeters. The sparking distance corresponding to the spark gap 10 may be in the edge region of the injection cone 6. By virtue of the length of the spark gap 10, in a stratified-charge mode 22 (FIG. 4) an ignitable mixture reliably impinges onto the sparking distance, even when the geometry of the injection cone 6 changes due to the carbonization of the injection nozzle or to similar circumstances. The second spark plug 8 is ignited solely in the stratified-charge mode 22, whereas the first spark plug 7 with the smaller spark gap 9 may be ignited in all the operating ranges of the internal combustion engine, but may be used during the homogeneous operating mode 27. Two spark plugs 7 and 8 are illustrated in the drawing. In principle, however, a plurality of spark plugs 7 with a small spark gap 9 and/or a plurality of spark plugs 8 with a higher spark gap 10 may also be used for each combustion space 3.

Figure 2:
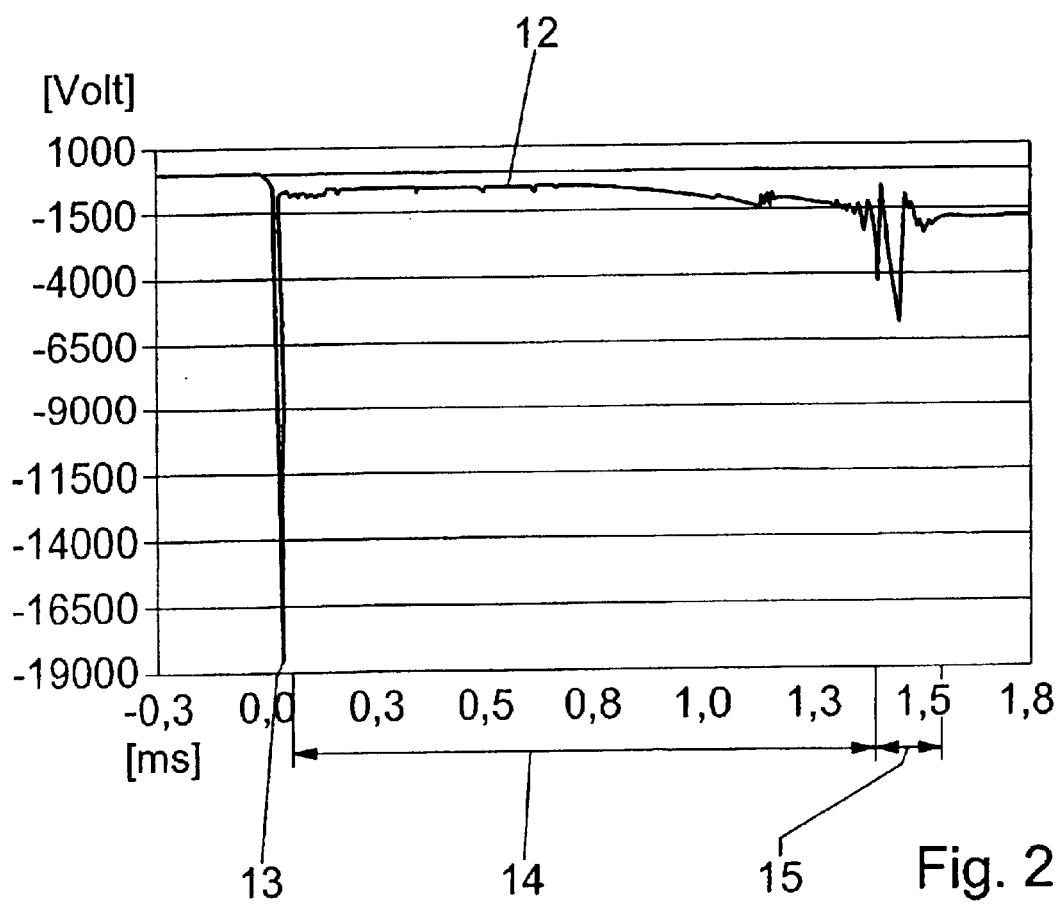
FIG. 2 illustrates a graph of a profile of a spark voltage against the spark duration.

The graph illustrated in FIG. 2 shows a voltage profile 12 of the spark voltage against time. At the ignition point 23, 30 (FIG. 4), the spark voltage rises steeply to a breakdown voltage 13 and subsequently, after the spark is ignited, falls, within a range 14, to a low arc voltage, until the spark is extinguished at the spark end 15.

Figure 3:
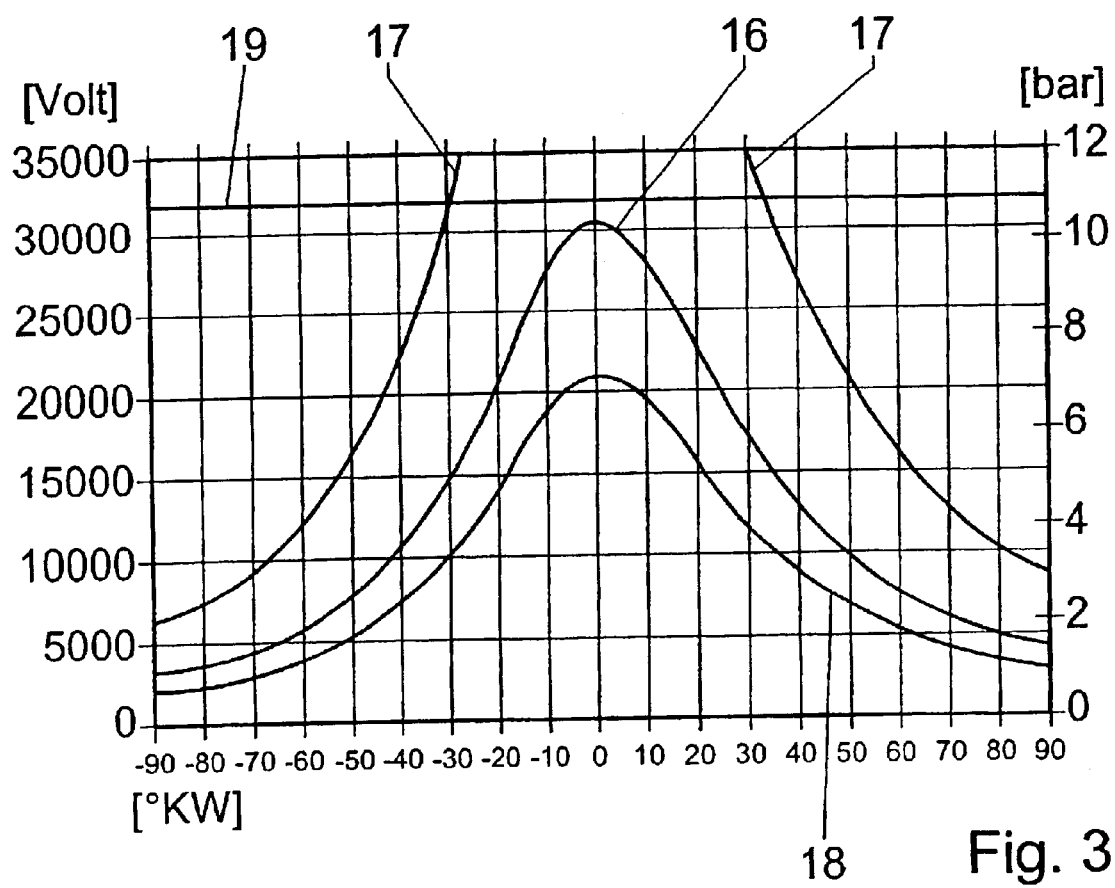
FIG. 3 illustrates a graph of a profile of a breakdown voltage and of a cylinder pressure against a piston position.

In the graph illustrated in FIG. 3, a profile 16 of the pressure in the cylinder 1 is illustrated against the angle of rotation KW of a crankshaft of the internal combustion engine. The pressure of the cylinder 1 assumes a maximum value at the top dead center of the piston 2 which is identified in the graph by the angle of rotation 0°. The breakdown voltage of the spark plugs 7 and 8 behaves according to the pressure profile 16, a profile 17 characterizing the breakdown voltage for a spark plug 8 with a higher spark gap 10 of approximately 3 millimeters, whilst a profile 18 identifies a breakdown voltage of a spark plug 7 with a smaller spark gap 9 of approximately one millimeter. A maximum ignition voltage which may be generated by the ignition system is designated by 19. It may be gathered from the graph illustrated in FIG. 3 that the breakdown voltage 18 of the spark plug 7 is below the maximum breakdown voltage 19 in all the operating ranges, with the result that the ignition reliability of the spark plug 7 may be ensured in all the operating ranges. By contrast, the graph illustrates that the breakdown voltage 17 of the spark plug 8 exceeds the maximum ignition voltage in a range of −30 to +35 degrees KW. The ignition of the spark plug 8 may not be ensured in this range.

FIG. 4 illustrates a diagram which covers a range of angle of rotation from −360° KW at the start of an intake stroke 20 to a top dead center OT at the end of a compression stroke 21. The top dead center OT at the end of the compression stroke 21 corresponds to an angle of rotation of 0° KW. In an example embodiment of the method according to the present invention for operating a four-stroke reciprocating-piston internal combustion engine, in a homogeneous mode 27 the fuel is introduced into the combustion space 3, during a fuel injection 28, as early as during the intake stroke 20. Due to the relatively long dwell time, a homogeneous fuel/air mixture is formed in the combustion space and is ignited by the spark plug 7 with the smaller spark gap 9 at the ignition point 30 just before top dead center OT. The breakdown voltage 18 is in this case below the maximum ignition voltage 19, as may be gathered from FIG. 3. After a short spark duration 29, the spark at the spark plug 7 is extinguished.

In the stratified-charge mode 22 of the internal combustion engine, which takes place essentially during the idling and in the lower rotational-speed and load range of the internal combustion engine, the spark plug 8 with the higher spark gap 10 is ignited even in a crank-angle range in which the breakdown voltage 17 is below the maximum ignition voltage 19 (cf. FIG. 3). Subsequently, the spark is maintained in the range of the arc voltage 14 with a low voltage which, however, may be increased at the start of fuel injection 25. Since there is still no fuel in the combustion space 3 at the ignition point 23, the ignition point 23 does not initiate the combustion of the fuel/air mixture, but, instead, the ignition point 26 of the fuel/air mixture is determined essentially by the start of the fuel injection 25 which is just before the top dead center OT at the end of the compression stroke 21. Thus, ignition reliability in the stratified-charge mode 22 may be improved and may be ensured over the useful life of the fuel injection device 4 at little outlay in terms of construction for the ignition system and with little energy.

What is claimed is:

1. A four-stroke reciprocating-piston internal combustion engine, comprising:
   a fuel injection device arranged centrally in a combustion space and configured to introduce fuel in a form of an injection cone into the combustion space; and
   at least two spark plugs for each combustion space, electrodes of each spark plug arranged at an edge of the injection cone, a second one of the spark plugs having a substantially larger spark gap than a first one of the spark plugs.

2. The four-stroke reciprocating-piston internal combustion engine according to claim 1, wherein the first one of the spark plugs is arranged toward an outlet side of the combustion space.

3. The four-stroke reciprocating-piston internal combustion engine according to claim 1, wherein the spark gap of the first one of the spark plugs is approximately 1 mm and the spark plug gap of the second one of the spark plugs is approximately 3 mm.

4. The four-stroke reciprocating-piston internal combustion engine according to claim 1, wherein the spark plug gap of the second one of the spark plugs is arranged in an edge region of the injection cone.

5. The four-stroke reciprocating-piston internal combustion engine according to claim 1, further comprising an ignition system having a controllable spark duration.

6. The four-stroke reciprocating-piston internal combustion engine according to claim 5, wherein the ignition system includes an alternating-voltage ignition system.

7. A method for operating a four-stroke reciprocating-piston internal combustion engine comprising: providing a fuel injection device arranged centrally in a combustion space and configured to introduce fuel in a form of an injection cone into the combustion space and at least two spark plugs for each combustion space, electrodes of each spark plug arranged at an edge of the injection cone, a second one of the spark plugs having a substantially larger spark gap than a first one of the spark plugs:
   in first operating ranges, operating the internal combustion engine in a stratified-charge mode including igniting the second one of the spark plugs at an ignition point before a breakdown voltage exceeds a maximum ignition voltage to be generated by an ignition system and injecting fuel into the combustion space with a start of ignition just before a top dead center after the ignition point and during a spark duration; and
   in second operating ranges, operating the internal combustion engine in a homogeneous mode including injecting the fuel into the combustion space predominantly during an intake stroke before the ignition point of the first one of the spark plugs;
   wherein the second one of the spark plugs is operated solely during the stratified-charge operating mode.

8. The method according to claim 7, further comprising:
   initially maintaining the spark duration of the second one of the spark plugs with minimal energy after the ignition point; and
   increasing spark current in accordance with a start of fuel injection.

* * * * *